(12) United States Patent
Gailloux et al.

(10) Patent No.: US 8,306,518 B1
(45) Date of Patent: Nov. 6, 2012

(54) HANDSET SERVICE MIGRATION AUTOMATION AND SUBSCRIBER IDENTITY MODULE TRACKING

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 261 days.

(21) Appl. No.: 12/643,989

(22) Filed: Dec. 21, 2009

(51) Int. Cl.
*H04M 3/00* (2006.01)
*H04M 3/42* (2006.01)
*H04M 1/64* (2006.01)
*H04M 7/00* (2006.01)

(52) U.S. Cl. .................. 455/418; 455/419; 455/414.1; 379/88.25; 379/221.13; 379/221.14; 379/201.12

(58) Field of Classification Search .............. 455/433, 455/458, 418–420, 410, 411, 414.1–414.2, 455/404.2; 379/88.25, 201.12, 213.01, 221.13
See application file for complete search history.

(56) References Cited

U.S. PATENT DOCUMENTS

| | | | |
|---|---|---|---|
| 6,192,242 B1* | 2/2001 | Rollender | 455/433 |
| 6,314,283 B1* | 11/2001 | Fielden | 455/411 |
| 7,266,371 B1* | 9/2007 | Amin et al. | 455/419 |
| 2004/0152455 A1* | 8/2004 | Herle | 455/418 |
| 2004/0166839 A1* | 8/2004 | Okkonen et al. | 455/419 |
| 2007/0010195 A1* | 1/2007 | Brown et al. | 455/3.06 |
| 2008/0096597 A1* | 4/2008 | Vempati et al. | 455/518 |
| 2009/0298478 A1* | 12/2009 | Tyhurst et al. | 455/414.1 |
| 2010/0210306 A1* | 8/2010 | Larsson | 455/558 |
| 2011/0075828 A1* | 3/2011 | Okita et al. | 379/201.02 |

* cited by examiner

*Primary Examiner* — Lester Kincaid
*Assistant Examiner* — Nalini Yerneni (57) ABSTRACT

A system is provided comprising a computer with processor, memory, and an application establishing a communication link with a mobile device provisioned with a first service on a wireless network. At least a portion of the link is provided by a wireless link over infrastructure of the network. The system also instructs the device to deactivate a key guard of the device, maps a first service indicator for a first network to a second indicator for a second network, instructs a provisioning system to remove the first service indicator from a service configuration of the device, and instructs the provisioning system to add the second service indicator to the service configuration of the device. The system also instructs a voice mail server to migrate a first voice mail data structure for the device based on the first service to a second structure for the device based on a second service, deprovisions the first service, and provisions the second service.

16 Claims, 6 Drawing Sheets

FIG. 6

HANDSET SERVICE MIGRATION AUTOMATION AND SUBSCRIBER IDENTITY MODULE TRACKING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of mobile communications devices may have a variety of wireless service types available within the network of a wireless communications service provider. Competing service providers may offer attractive alternate service types. Users may migrate wireless handsets from a first service type to a second service type. A user may, for example, transition from a wireless service type wherein services are paid for after usage and upon the close of a service period to a wireless service type wherein the user pays in advance for services at the start of a service period. Migration of service types may, in some instances, involve replacing the subscription identity module in the user's wireless handset. Changing a service type, that may, for example, involve purchasing a different quantity of service hours or other combination of wireless services, may not require a replacement of the subscription identity module. In an embodiment, different service types may be associated with different network infrastructure used by a wireless service provider. A service provider that transitions a customer between service types may have to move the customer to a different area of the provider's network infrastructure.

SUMMARY

In an embodiment, a system for handset service migration is provided. The system comprises a computer having a processor and a memory and an application stored in the memory that, when executed by the processor, establishes a communication link with a mobile device provisioned with a first service on a wireless communication service provider network, wherein at least a portion of the communication link is provided by a wireless link over infrastructure of the wireless communication service provider network. The system also sends a message to the mobile device to turn off a key guard function of the mobile device and maps a first service indicator associated with a first network to a second service indicator associated with a second network. The system also sends a message to a provisioning system to remove the first service indicator from a service configuration of the mobile device. The system also sends a message to the provisioning system to add the second service indicator to the service configuration of the mobile device. The system also sends a message to a voice mail server to migrate a first voice mail data structure associated with the mobile device based on the first service to a second voice mail data structure associated with the mobile device based on a second service. The system also deprovisions the first service from the mobile device and provisions the second service to the mobile device.

In an embodiment, a processor-implemented method for handset service migration is provided. The method comprises a server determining that a mobile device that formerly had a first subscriber identity module installed associated with a first service type has had a second subscriber identity module installed associated with a second service type. In response to determining the replacement of the first subscriber identity module with the second subscriber identity module in the mobile device, the method also comprises the server sending a message to the mobile device to disable a key guard function of the mobile device. The method also comprises the server mapping a first service indicator associated with the first service type to a second service indicator associated with the second service type and the server sending a message to a provisioning system to remove the first service indicator from a service configuration of the mobile device. The method also comprises the server sending a message to the provisioning system to add the second service indicator to the service configuration of the mobile device. The method also comprises the server sending a message to a voice mail server to migrate a first voice mail data structure associated with the mobile device based on the first service type to a second voice mail data structure associated with the mobile device based on the second service type. The method also comprises the server deprovisioning the first service type from the mobile device and the server provisioning the second service type to the mobile device.

In an embodiment, a subscriber identity module (SIM) tracking system is provided. The system comprises a computer comprising a processor and a memory and an application stored in the memory that, when executed by the processor, creates a data record associated with a subscriber identity module, the data record comprising at least a first mobile device identification of a first mobile device and a first time. The system also updates the data record with a second mobile device identification of a second mobile device and a second time. The system also analyzes the data record to determine a usage statistic, wherein the usage statistic is used to achieve a business objective selected from at least one of determining a marketing opportunity and offering a service based on associating the subscriber identity module with the second mobile device, wherein the second mobile device has more functional capabilities than the first mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and method to promote a wireless communications service provider avoiding potential problems associated with customers migrating between wireless service types, for example migrating between a pre-paid service type to a post-paid service type. In an embodiment, the system promotes the service provider tracking the usage and ownership lifecycle of subscriber identity modules (SIM) used in wireless communications devices. The present disclosure teaches a service establishment method for migrating an existing wireless customer to a different service type. The method may alleviate problems associated with migrating from a service type providing services on a pre-paid basis to a type providing service on a post-paid basis, or vice versa. The method may automate the migration process and reduce processing cost. The method may minimize customer involvement, improve the customer experience, reduce customer turnover arising from difficult service migrations, and support profitability.

Tracking subscriber identity module lifecycles by establishing data records for the modules may allow a wireless communications service provider to develop profiles of its users and gather information about the usage of the provider's products, particularly when the products are mobile telephones that may be periodically upgraded. Aggregating and analyzing data about subscriber identity module usage over the subscriber identity module's useful life may produce results that may be used in product development and the creation of marketing strategy. The analyzed data may be packaged as business intelligence that may have commercial value to the wireless communications service provider.

In an embodiment, a user changing wireless service types may keep the same wireless handset, insert a new subscriber identity module, and expect all existing applications, settings, preferences, and data to remain in effect. The present disclosure teaches a system that during migration may send a message disabling some security settings resident on the handset. During migration, the system may also send messages to a provisioning system to change service indicators stored in a service configuration for the handset. Service indicators may be flags or states set in a provisioning database that designate optional functionality that has been configured for a handset and/or wireless service plan. The security settings and previous service indicators may interfere with the migration if left in place. The service migration method taught herein may also migrate the user's voicemail and other applications, including settings and data, redirect the user to a digital storefront associated with the new service, and make ring-tones and other features available under the new service. The interactions of the system may take place rapidly and with minimal action by the user and with little or no human involvement by the wireless communications service provider.

The present disclosure further teaches streamlining the process of transitioning a customer from a first service type to a second service type. The second service type may be a new service type not previously provided by the communication service provider. Streamlining may result in a reduction of calls to a customer support function associated with a wireless communications service provider. Each call may impose a processing cost on the service provider and increase the overall cost to the service provider of acquiring new or migrated customers under an upgraded service type. Migration complications and interruptions requiring calls to a provider's customer care function may also raise customer frustration and may result in customer turnover. Calls to the customer support function may increase when users of portable electronic devices encounter migration glitches, hiccups, and interruptions arising from key guard problems, service indicator problems, or other migration process complications. The present disclosure teaches systems and methods that may reduce migration problems that may result in calls to customer support. Further, a wireless service provider that causes the migration process to be smooth and without complications may also avoid loss of revenue per user from an electronic storefront that may result from migration problems.

Figure 1:
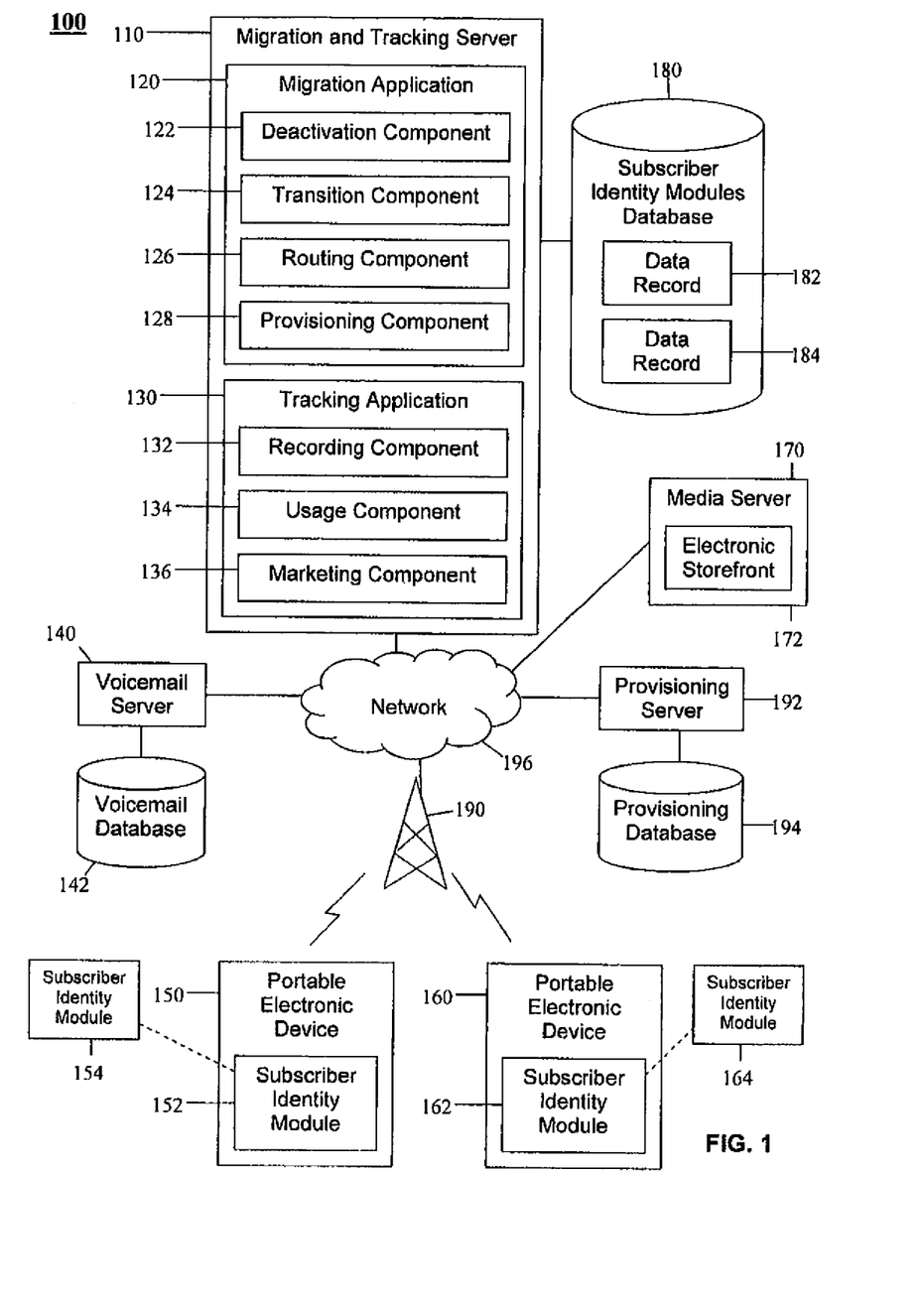
FIG. 1 is a block diagram of a system according to an embodiment of the disclosure.

Turning now to FIG. 1, a system 100 for handset service migration automation and subscriber identity module tracking is provided. The system 100 comprises a migration and tracking server 110, a migration application 120, a tracking application 130, a voicemail server 140, a voicemail database 142, portable electronic devices 150, 160, subscriber identity modules 152, 154, 162, 164, a media server 170, an electronic storefront 172, a subscriber identity modules database 180, data records 182, 184, a base transceiver station 190, a provisioning server 192, a provisioning database 194, and a network 196.

The migration and tracking server 110 may be a computer system. Computer systems are discussed in greater detail hereinafter. The migration and tracking server 110 may comprise one computer or a plurality of computers, for example, a server farm wherein many server computers cooperate to share a processing load. The migration and tracking server 110 may comprise a plurality of computers that are located at different places, for example, to provide geographical diversity and increased service reliability. The migration and tracking server 110 executes one or more applications including the migration application 120 and the tracking application 130.

The migration application 120 executes on the migration and tracking server 110 and receives requests to migrate a customer account relationship from one wireless communications service type to another wireless communications service type. The migration application 120 may implement a service establishment method adopted by a wireless communications service provider to convert customer applications, services, and data associated with existing service types to new service types. The migration application 120 may circumvent and resolve issues associated with the migration to new service types. A customer upgrading wireless service types and possibly acquiring the portable electronic device 150 may wish to migrate many of the service features previously enjoyed to the new service type and portable electronic device 150. The customer may also wish to migrate applications, data files, voicemail and other settings, and previously configured preferences. The migration may involve transitioning between service types on the same wireless network or between service types on different wireless networks. The term "service type" as used herein comprises wireless service subscription plans and other arrangements offered by wireless communications service providers and others. The term includes variations of voice and data service hours and other applications made available by providers. "Service type" as used herein also comprises variations of payment arrangements including and prepaid and postpaid service arrangements.

Migrating to a new service type may involve making a plurality of changes to a subscriber identity module 152 used by the portable electronic device 150. Migrating to a new service type may involve installing a different subscriber identity module 152. The changes may comprise deleting some existing information from the subscriber identity module 152 and writing new information to the subscriber identity module 152. Migrating between service types may also comprise the migration application 120 sending messages to servers and other supporting devices on the wireless network. The messages provide instructions to migrate information specific to the customer's account from the existing service type to the new service type. The servers and other devices contacted by the migration application 120 may support the voicemail and other services previously delivered to the customers and may support the migration to the services delivered under the new service type. Transitioning those services from the existing to the new service type with the minimum possible customer involvement, service interruption, and processing cost may be a goal of a wireless communications service provider.

The migration application 120 comprises the deactivation component 122 that deactivates functionality from the portable electronic device 150 associated with the existing or previous service type. The deactivation component 122 may also change service indicators for the network association of the portable electronic device 150. A customer transitioning from an existing to a new service type offered by a wireless service provider may follow a series of migration steps set forth by the wireless service provider. In an embodiment, the portable electronic device 150 may have a key guard feature that activates either by default after passage of time or by user initiation. The key guard feature, hereinafter referred to as the key guard, may prevent undesired response to key inputs, for example unintended activations of keys when the portable electronic device 150 is carried in a pocket, is stowed in a protective carry case, or other normal use conditions. In an embodiment, a specific key input or key input sequence may cause the portable electronic device 150 to turn off the key guard feature temporarily or until the key guard feature is next activated by user input. When transitioning from an existing service type to a new service type, the steps may require the removal of subscriber identity module 152 from the portable electronic device 150 and installation of the subscriber identity module 154. The user may be also required to enter information that includes instructions and responses requiring a plurality of keypad entries.

At one or more points during the hardware exchanges and multiple keypad entries, the key guard may activate, for example when the key guard feature is designed or configured to activate after passage of a predefined period of time, thereafter disabling response by the portable electronic device 150 to key inputs. In some instances, the key guard may activate without the user's knowledge. The user may continue making keypad entries and not realize that the portable electronic device 150 has disabled the keypad. The occurrence of any of these problems related to a key guard may disrupt migration and result in customer frustration and calls to a wireless communications service provider's customer care function. This may further result in increased cost to the provider and risk of loss of the customer relationship. The deactivation component 122 sends a message to the portable electronic device 150 that disables the key guard function. This action may circumvent some of the problems described above and may permit the transition from the existing service type to the new service type to continue.

In addition to disabling a key guard, the deactivation component 122 may also remove at least one service indicator associated with the previous service type and replace it with a service indicator associated with the new service type. For example, a group talk capability of a push-to-talk functionality service indicator associated with the previous service type may be removed, mapped to a second service indicator for use in the new service type, and the second service indicator enabled. Additionally, in an embodiment, a third service type associated with the first service type may be removed and no corresponding service type associated with the second service type is enabled. Generally, services and/or functions identified by service indicators that are available in the first service type may not be available in the second service type and may need to be either mapped to a different service indicator that identifies a comparable service and/or function available in the second service type or simply deleted. The deactivation component 122 may contact the provisioning server 192 to complete these steps. The provisioning server 192 may be used to associate portable electronic devices 150, 160 and subscriber identity modules 152, 154, 162, 164 with wireless service types. The provisioning server 192 may record changes to service indicators in the provisioning database 194.

The migration application 120 also comprises the transition component 124 that migrates a customer's voicemail and other services during the transition from an existing service type to the new service type. The transition component 124 may contact a voicemail server 140 that manages voicemail services for a plurality of portable electronic devices 150, 160. The voicemail server 140 may access a voicemail database 142 that stores voicemail mailboxes for the portable electronic devices 150, 160. In an embodiment, a voicemail data structure based on the previous service type may not migrate seamlessly to the new service type. The new service type may offer options or features not available under the previous service type, and the user of the portable electronic device 150 may make choices regarding the configuration of voicemail under the new service type. Hardware changes accompanying the transition of service types may create additional challenges for the transition component 124. The user of the portable electronic device 150 may want existing voicemail announcement messages to be migrated over to the new service type. The mailbox containing previously received and stored voicemail messages may also be migrated. Additionally, other stored contact information, user preferences, and other configuration information may be migrated. Saved short message service (SMS) messages, also known as text messages, may be migrated to the new service type. In an embodiment, the transition component 124 may also assist with the transition of other applications and associated data from the previous service type to the new service type.

The migration application 120 also comprises the routing component 126 that sends a message to a media server 170 to provision a digital media platform or electronic storefront 172 accessible by the portable electronic device 150 under the new service type. The digital media platform or electronic storefront 172 receives selected routed calls from the portable electronic device 150, the calls requesting a plurality of features and services under the new service type. The media server 170 may be associated with the wireless service provider and may host a variety of services and data including the electronic storefront 172. Because a new service type may involve additional and enhanced services available to the portable electronic device 150, the user may be provided a means to easily reach the wireless service provider's electronic storefront 172 to access the services. At the electronic storefront 172, the portable electronic device 150 may be able to acquire and install additional wireless services and applications. The portable electronic device 150 may also be able to use the storefront 172 to create keypad shortcuts to access these services as well as obtain technical support, repair, and other services directly from the wireless service provider or arrange access to outside services made available by the provider such as access to emergency responders.

Configuration files resident on the portable electronic device 150 or elsewhere that are accessed by the portable electronic device 150 may contain electronic links or references to the electronic storefront 172 and sites within the electronic storefront 172. The links or references may be uniform resource locators (URL). When a portable electronic device 150 migrates from one service type to another service type, it may be desirable to change the electronic links and references to properly direct inquiries to the area of the electronic storefront 172 appropriate to the new service type. It may be of commercial importance to a wireless service provider that electronic links for a portable electronic device 150 are current and appropriate for the new service type. A wireless service provider may seek to optimize the quantity and quality of visits to the electronic storefront 172 by the portable electronic device 150 because the service provider may be able sell additional services to the portable electronic device 150 from the electronic storefront 172. The electronic storefront 172 may contribute significantly to user-generated revenue for the service provider. The service provider may want to provide convenient access to the electronic storefront 172 for this reason. Electronic links and references available to the user preferably are migrated correctly and without effort or inconvenience to the user. If migration of the links and references becomes troublesome to the user, the user may discontinue visiting the electronic storefront 172 and revenue per user (RPU) to the service provider may be lost.

The routing component 126 establishes the access to the electronic storefront 172 associated with the new service type. The routing component 126 may install or update keypad shortcuts on the portable electronic device 150 and may provide instructions to the portable electronic device 150 on the use of those shortcuts. The electronic storefront 172 may also comprise a client software component that is installed by the routing component 126 on the portable electronic devices 150, 160. The electronic storefront 172 may be a portal or entry point for portable electronic devices 150, 160 to access services made available by the wireless service provider or others under the new service type. The electronic storefront 172 may be accessible only to those portable electronic devices, for example portable electronic devices 150, 160, subscribing to the new wireless service type. In an embodiment, the media server 170 may host a plurality of electronic storefronts 172 associated with a plurality of different wireless service types.

The migration application 120 also comprises the provisioning component 128 that performs additional steps of deprovisioning the existing service and provisioning the new service for the portable electronic device 150. The provisioning component 128 may advise the media server 170 of the telephone number associated with the new service type for the portable electronic device 150. When a user enrolls in a new service type, the user may receive a new portable electronic device 150, for example a mobile telephone, may receive a new subscriber identity module 152, and may also receive a new telephone number. In an embodiment, the user may not receive a new telephone number and may use his or her previous telephone number. If the new telephone number received by the portable electronic device 150 was previously associated with a different user, a different wireless service type, and/or different hardware, the provisioning component 128 may take steps to dissociate the telephone number from its previous associations. The provisioning component 128 also enables the portable electronic device 150 to purchase a new ring-tone. Enabling the portable electronic device 150 to obtain the new ring-tone may involve configuring the digital media platform or electronic storefront 172 on the media server 170 to make available a plurality of ring-tones for testing and selection by the portable electronic device 150. In an embodiment, the portable electronic device 150 may purchase more than one ring-tone.

In an embodiment, the components of the migration application 120 may function concurrently and cooperatively while deprovisioning an existing or previous service type and provisioning a new service type. The actions taken at various points during migration may include turning off a key guard function and changing service indicators, transitioning over voice mail service including data and preferences, enabling access on a media server 170 to an electronic storefront 172 to activate new services including ring-tones, and associating a telephone number with the new service type and dissociating the telephone number with a previous customer, service type, and/or hardware. The present disclosure teaches a service establishment method executed by the migration application 120 to properly complete each of these steps in the prescribed order. The method may comprise the execution of scripts by the migration application 120 that may entail a plurality of interactions among the components of the migration application 120. In an embodiment, the interactions of the components may not be visible to the user of the portable electronic device 150.

The portable electronic device 150, 160 may be one of a mobile telephone, a personal digital assistant (PDA), and a media player. In an embodiment, a user may access wireless communications services through the use of a wireless adapter card associated with one of a desktop computer, a laptop computer, and a tablet computer. In an embodiment a wireless link accessed by a portable electronic device 150, 160 is provided based on a wireless technology including one of a code division multiple access (CDMA) technology, a global system for mobile telecommunication (GSM) technology, a long-term evolution (LTE) technology, and a worldwide interoperability for microwave access (WiMAX) technology. In an embodiment, the wireless link is provided by one of a Wi-Fi technology and a Bluetooth technology.

Subscriber identity modules 152, 162 are associated with portable electronic devices 150, 160 and may be interchangeable within the portable electronic devices 150, 160. Subscriber identity modules 152, 162 are used to authenticate portable electronic devices 150, 160 and broker the access of the portable electronic devices 150, 160 to the network 196 of the wireless service provider.

In an embodiment, the tracking application 130 may execute on the migration and tracking server 110 and create data records associated with subscriber identity modules 152, 162. In another embodiment, however, the tracking application 130 may execute on a different computer system and/or a different server. The tracking application 130 tracks and analyzes the ownership and usage history of the subscriber identity modules 152, 162. The tracking application 130 may assist in determining marketing opportunities and developing additional services based on a plurality of usage histories and data records. A wireless communications service provider may install subscriber identity modules 152, 162 into portable electronic devices 150, 160, respectively. The wireless communications service provider may purchase subscriber identity modules 152, 162 from a plurality of hardware manufacturers. The provider may wish to track the movement of subscriber identity modules 152, 162 from one portable electronic device 150, 160 to the next and from one user to the next during the useful lives of the subscriber identity modules 152, 162. The data about usage of the subscriber identity modules 152, 162 may be of commercial value to the wireless communications service provider. The valuable data may comprise, for example, demographic or economic information about individuals or groups who use the subscriber identity modules 152, 162, the applications used, and the portable electronic device 150, 160 hardware involved. When this data is gathered and aggregated for a plurality of subscriber identity modules 152, 162 over the useful lives of the subscriber identity modules 152, 162, the data may be statistically significant. The data may provide insights into demographic trends and consumer behavior and may foster the creation of valuable business intelligence.

A wireless communications service provider may have difficulty tracking subscriber identity modules 152, 162 because the provider may purchase a large quantity of subscriber identity modules 152, 162 and distribute them in various unequal quantities to vendors of the provider's portable electronic devices 150, 160. A wireless communications service provider with an extensive distributor network may send small quantities of subscriber identity modules 152, 162 to many geographically dispersed distributors. When a service provider has no control or influence over the numbering or serialization of subscriber identity modules 152, 162, the provider may have difficulty maintaining records on the specific subscriber identity modules 152, 162 that were distributed to certain vendors. It is unlikely that the wireless communications service provider would be able to then track the portable electronic devices 150, 160 into which the subscriber identity modules 152, 162 were installed and thereafter track usage. The opportunity to gather data about usage of the subscriber identity modules 152, 162, their movement between portable electronic devices 150, 160, and potentially valuable user data may be lost. A service provider may also desire to reduce "leakage" of subscriber identity modules 152, 162 wherein the provider may distribute a certain quantity of subscriber identity modules 152, 162 and only a certain portion of them ever become active on the provider's network. The tracking application 130 may allow the provider to track the movement, usage, and user identification of a greater portion of all subscriber identity modules 152, 162 sold.

A wireless communications service provider may instruct a manufacturer or supplier of subscriber identity modules 152, 162 to arrange the numbering of unique identifiers that the supplier sells to the provider in a sequential or other manner that may enable the provider to more easily track the subscriber identity modules 152, 162. The wireless communications service provider may cause the supplier to arrange the numbering of unique identifiers to begin at a specifically numbered unique identifier and reserve a block of sequential unique identifiers thereafter for the provider. The wireless communications service provider may then more easily associate data records with each uniquely numbered subscriber identity module 152, 162. In an embodiment, a purpose of the tracking application 130 is to track the lifecycle of the subscriber identity modules 152, 162 in use. Such tracking may comprise monitoring usage of the subscriber identity modules 152, 162 in various portable electronic devices 150, 160, and compiling the lifecycle, usage, and other information for future product and marketing strategy development as well as for potential commercial distribution.

The tracking application 130 comprises a recording component 132 that creates a data record 182 associated with a subscriber identity module 152. In an embodiment, a plurality of data records 182, 184 may be stored in a subscriber identity modules database 180. The data record 182 may identify the subscriber identity module 152 by its manufacturer, model number, and unique identifier. The recording component 132 may also record a first time or date and timestamp of the creation of the data record 182. The number or other identifier of the data record 182 in the subscriber identity modules database 180 may be the unique identifier itself. The data record 182 may also comprise the identity of the user and a profile of the user. The data record 182 may identify the portable electronic device 150 into which the subscriber identity module 152 is originally installed. The recording component 132 also monitors changes to the initially compiled information, such as when the subscriber identity module 152 may be removed by the user from the original portable electronic device 150 and reinstalled in a different or newer portable electronic device 160 that may have more features. The recording component 132 may record the movement of the subscriber identity module 152 to the portable electronic device 160 in the data record 182 as a second time or date and timestamp.

The ability of the newer portable electronic device 160 with its potentially richer features and possible upgraded service type to run properly with the subscriber identity module 152 may be of interest to the wireless communications service provider. If the user changes, the recording component 132 may gather and report information about the new user. Some users move subscriber identity modules 152, 162 between portable electronic devices 150, 160 on a regular basis. Discovering the motives for these activities may yield further business and product intelligence. The recording component 132 gathers lifecycle information about a plurality of subscriber identity modules 152, 162 and associates the information with specific data records 182, 184 for each subscriber identity module 152, 162.

The tracking application 130 also comprises the usage component 134 that compiles statistics about usage of subscriber identity modules 152, 162 during their useful lives. The usage information may comprise data about the types and frequency of calls made, data about other communications services used such as text messaging, and data about other applications available on the portable electronic devices 150, 160. The usage information may include data about the physical movements of the subscriber identity module 152, for example, if the subscriber identity module 152 had been used in various foreign countries. Usage information gathered may be associated with information about portable electronic devices 150, 160 and the features and capabilities of the specific portable electronic device 150, 160 in which the user chooses to use the specific subscriber identity module 152 being tracked. The usage information may include data about support incidents created for the subscriber identity module 152 and any repair or service activity associated with the subscriber identity module 152.

In an embodiment, a subscriber identity module 152 may be moved from one portable electronic device 150 to another portable electronic device 160. The usage component 134 may compile a usage statistic about the subscriber identity module 152 during the lifecycle of the subscriber identity module 152. The usage statistic may be used to achieve a business objective selected from at least one of determining a marketing opportunity and offering a service based on associating the subscriber identity module 152 with the portable electronic device 160, wherein the portable electronic device 160 may have more functional capabilities than the portable electronic device 150.

The usage component 134 gathers the various items of information described and combines the information with user information gathered by the reporting component 132. The usage component 134 may analyze this information and provide the analyses to the wireless communications service provider. The provider may choose to save this information with information about a plurality of portable electronic devices 150, 160. The usage component 134 may promote a wireless communications service provider developing valuable business intelligence for use in creating new products, generating further revenue from existing products, and creating marketing strategies.

The tracking application 130 also comprises the marketing component 136 that may further analyze and package the information gathered in data records 182, 184 by the recording component 132 and the usage component 134 in manners that may be commercially valuable. A wireless communications service provider compiling this packaged information may make the information available on a commercial basis to consumer product companies, government agencies, academic researchers, consumer and product data warehousing and data mining organizations, and credit bureaus. The marketing component 136 may examine large quantities of aggregated and analyzed data, determine statistically significant relationships and trends that indicate large scale product, consumer, and economic developments, and package the data for distribution. The marketing component 136 may conduct queries of databases and data processing entities outside of the system 100 to determine interest in business intelligence developed by the tracking application 130. The marketing component 136 may make the data available in a raw format to various buyers for their own analysis.

In an embodiment, components of the migration application 120 may interact with components of the tracking application 130. During a customer's relationship with a wireless communications service provider, when the customer receives a new portable electronic device 150 or upgrades to a different and perhaps more feature-rich portable electronic device 160, the tracking application 130 will record these events in the data record 182 associated with the subscriber identity module 152 in the portable electronic device 150. During a migration, while the components of the migration application 120 are deprovisioning the previous wireless service and provisioning the new wireless service, the components of the tracking application 130 may be creating or updating the data record 182 with the migration information.

The base transceiver station 190 may be any of a cellular wireless base station, based on for example a Code Division Multiple Access (CDMA), Global System for Mobile Communications (GSM), Universal Mobile Communications System (UMTS), and/or Long-term Evolution (LTE) cellular wireless base station technology; a World-wide Interoperable Microwave Access (WiMAX) base station technology; a WiFi access point technology; or other wireless access device technologies. While FIG. 1 depicts only one base transceiver station 190, in an embodiment a plurality of base transceiver stations 190 may be existent and in operation.

The network 196 promotes communication between the components of the system 100. The network 196 may be any communication network including a public data network (PDN), a public switched telephone network (PSTN), a private network, and/or a combination thereof.

Figure 2A:
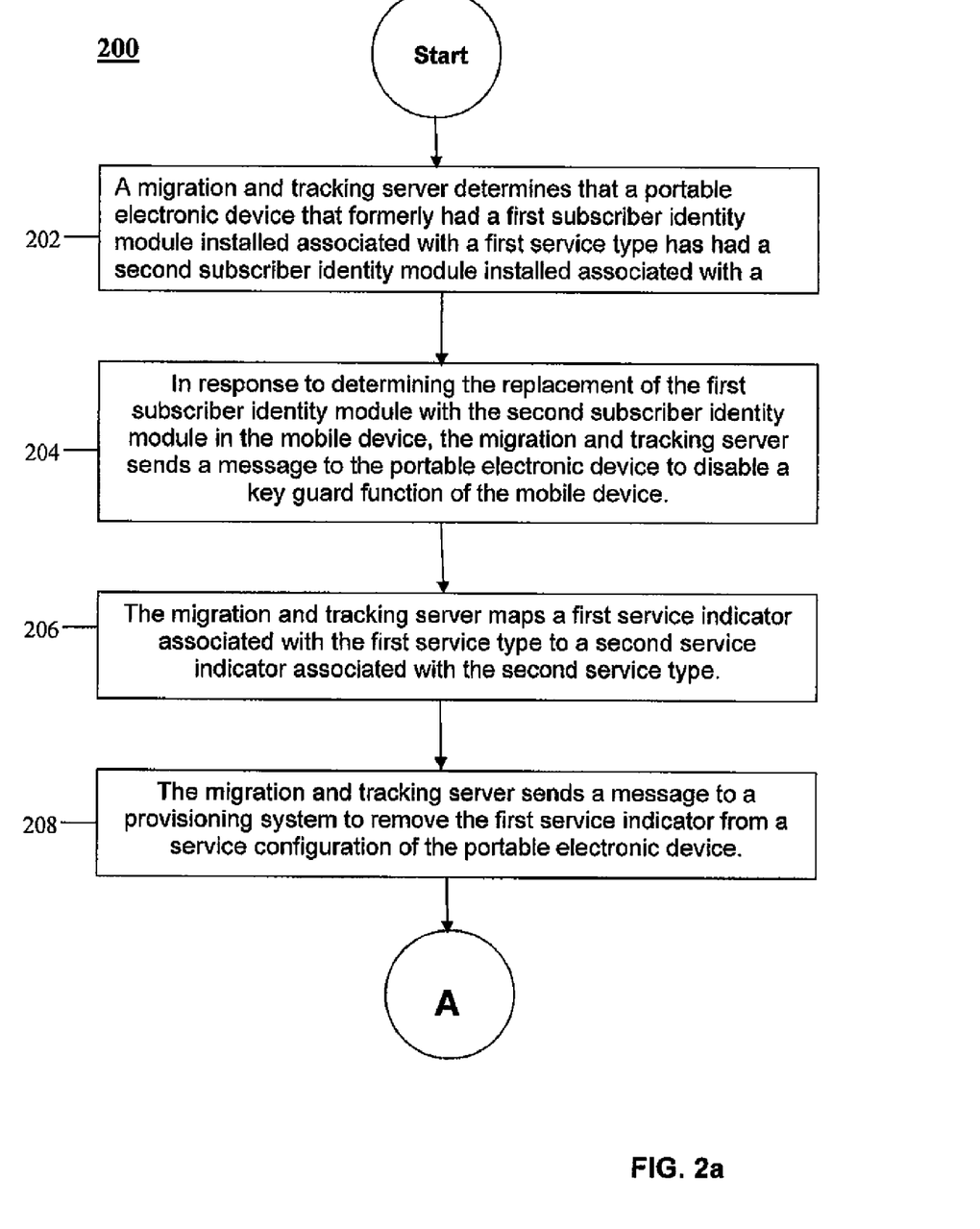
FIG. 2a is a flow chart illustrating a method according to an embodiment of the disclosure.
Figure 2B:
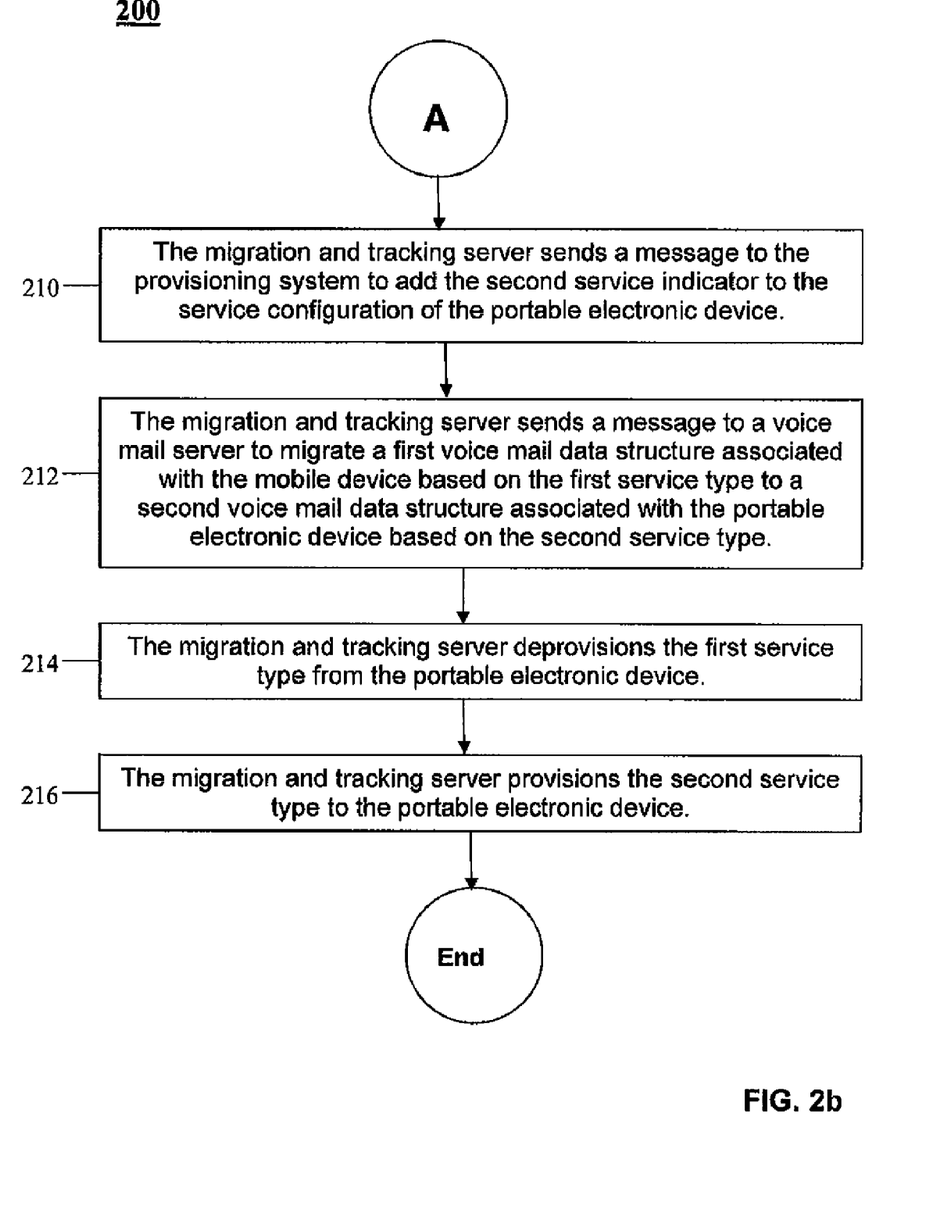
FIG. 2b is a flow chart illustrating a method according to an embodiment of the disclosure.

Turning now to FIG. 2, a method 200 of handset service migration automation is provided. In an embodiment, a portable electronic device 150 may migrate from a wireless service type with a pre-paid payment arrangement to a wireless service type with a post-paid arrangement. In an embodiment, a portable electronic device 150 may migrate from a wireless service type with a post-paid arrangement to a wireless service type with a pre-paid payment arrangement.

Beginning at block 202, the migration and tracking server 110 determines that a portable electronic device 150 that formerly had a first subscriber identity module 152 installed associated with a first service type has had a second subscriber identity module 154 installed associated with a second service type. In an embodiment, the user of the portable electronic device 150 may have removed the first subscriber identity module 152 and replaced it in the portable electronic device 150 with the second subscriber identity module 154. This action may initially have been discovered and reported by a device (not shown) in the network 196 that executes an application providing authentication, authorization, and accounting (AAA) services for the wireless communications service provider used by the portable electronic device 150. A similar action may also, for example, be discovered if the user removes the subscriber identity module 152 and places it in a different communications device, for example portable electronic device 160.

At block 204, the migration and tracking server 110 sends a message to the portable electronic device 150 to disable a key guard function of the portable electronic device 150. This action is in response to the migration and tracking server 110 determining that the user of the portable electronic device 150 had removed the first subscriber identity module 152 and replaced it with the second subscriber identity module 154.

At block 206, the migration and tracking server 110 maps a first service indicator associated with first service type to a second service indicator associated with a second service type. This mapping may take place in a file stored in the migration and tracking server 110. The service indicator associated with the service type used by the portable electronic device 150 is changed from the first service to the second service.

At block 208, the migration and tracking server 110 sends a message to the provisioning server 192 requesting removal of the first service indicator from the configuration of the portable electronic device 150. The provisioning server 192 accesses the provisioning database 194, locates at least one file containing the configuration of the portable electronic device 150, and removes the first service indicator from the at least one file.

At block 210, the migration and tracking server 110 sends a message to the provisioning server 192 requesting addition of the second service indicator to the configuration of the portable electronic device 150. The provisioning server 192 accesses the provisioning database 194, locates at least one file containing the configuration of the portable electronic device 150, and adds the second service indicator to the at least one file. In an embodiment, the processing of blocks 208 and 210 may be combined. For example, in an embodiment, a single message may be sent by the migration and tracking server 110 to the provisioning server 192 requesting both that the first service indicator be removed and that the second service indicator be added. Additionally, in an embodiment, the processing of block 206, mapping the first service indicator associated with the first service type to the second service indicator associated with the second service type, may be performed by the provisioning server 192. For example, in an embodiment, the migration and tracking server 110 may send a single message to the provisioning server 192 requesting that the service indicators for the subject portable electronic device 150 be migrated from the service indicators associated with the first service type to the appropriate corresponding service indicators associated with the second service type, delegating to the provisioning server 192 the responsibility to map between the first service indicator and the second service indicator.

At block 212, the migration and tracking server 110 sends a message to the voicemail server 140. The message requests the voicemail server 140 to migrate a first voicemail data structure associated with the portable electronic device 150 based on the first service type to a second voicemail data structure associated with the portable electronic device 150 based on the second service type.

At block 214, the migration and tracking server 110 deprovisions the first service type from the portable electronic device 150. At block 216, the migration and tracking server 110 provisions the second service type to the portable electronic device 150.

Figure 3:
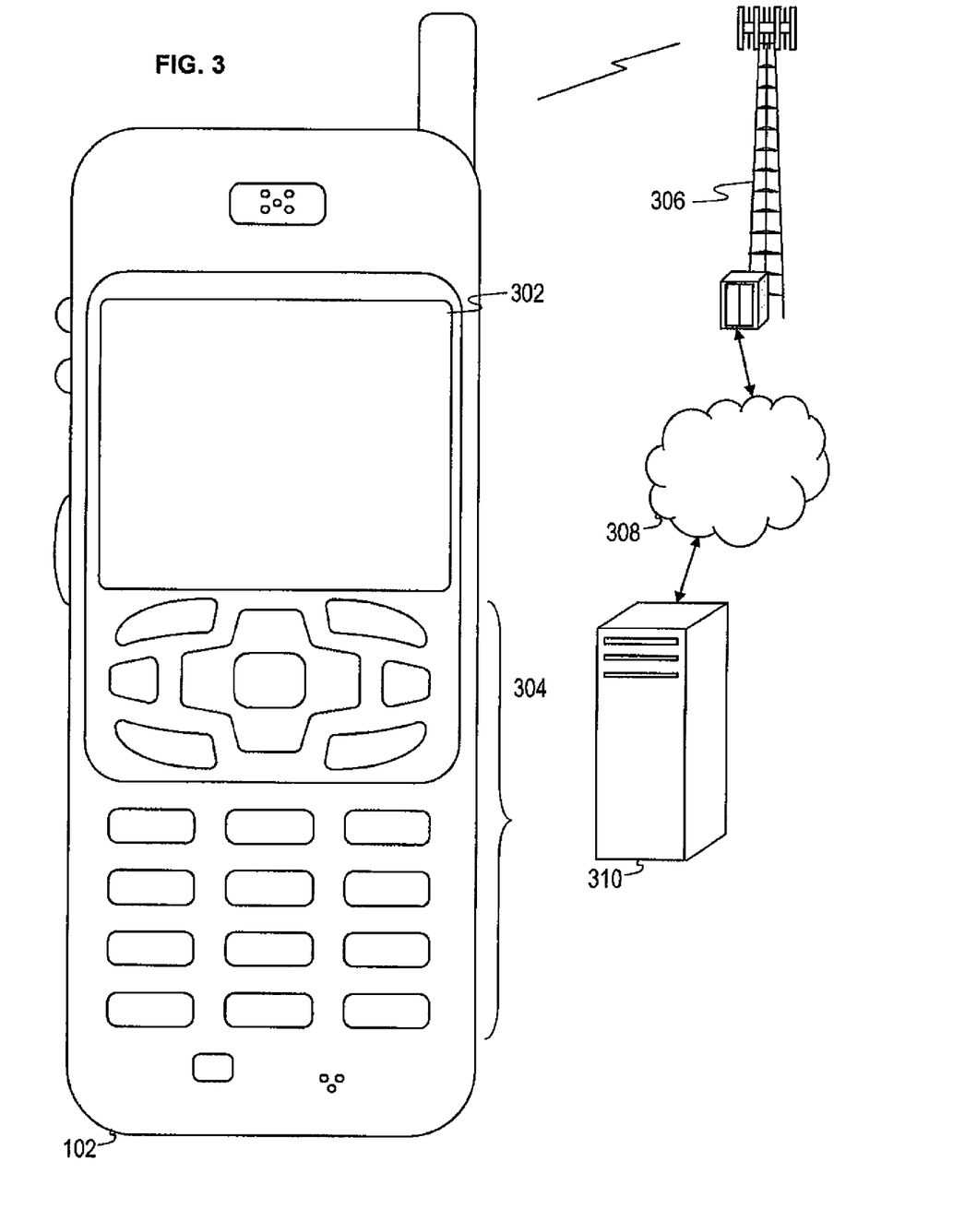
FIG. 3 is an illustration of a mobile device according to an embodiment of the disclosure.

FIG. 3 shows a wireless communications system including the mobile device 102. FIG. 3 depicts the mobile device 102, which is operable for implementing aspects of the present disclosure, but the present disclosure should not be limited to these implementations. The mobile device 102 may in some embodiments exemplify the portable electronic device 150, 160 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface and/or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 302 to show a web page. The web page may be obtained via wireless communications with a base transceiver station (BTS) 306, a wireless network access node, a peer mobile device 102 or any other wireless communication network or system. While a single base transceiver station 306 is illustrated, it is understood that the wireless communication system may comprise additional base transceiver stations. In some instances, the mobile device 102 may be in communication with multiple base transceiver stations 306 at the same time. The base transceiver station 306 (or wireless network access node) is coupled to a wired network 308, such as the Internet. Via the wireless link and the wired network, the mobile device 102 has access to information on various servers, such as a server 310. The server 310 may provide content that may be shown on the display 302. Alternately, the mobile device 102 may access the base transceiver station 306 through a peer mobile device 102 acting as an intermediary, in a relay type or hop type of connection.

Figure 4:
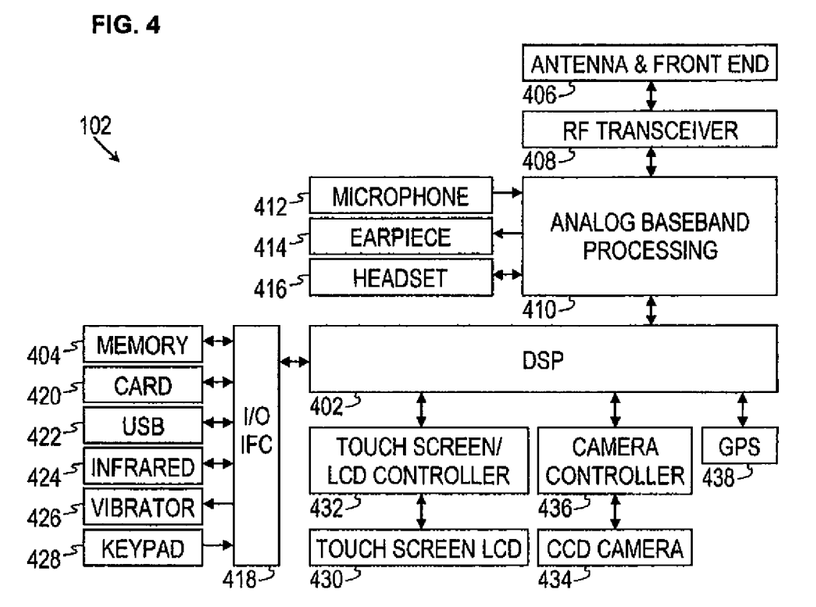
FIG. 4 is a block diagram of a mobile device according to an embodiment of the disclosure.

FIG. 4 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby handsets and/or wireless base stations.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
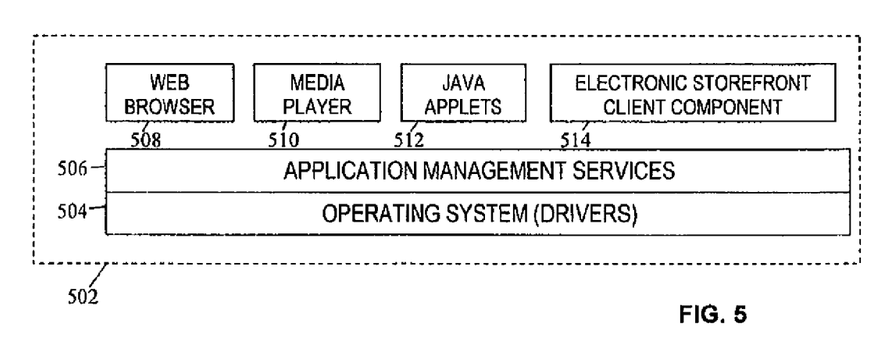
FIG. 5 is a block diagram of a software configuration for a mobile device according to an embodiment of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the mobile device 102. Also shown in FIG. 5 are a web browser application 508, a media player application 510, and JAVA applets 512. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality. The electronic storefront client component 514 is software resident and executing on the mobile device 102 that permits the mobile device 102 to interact with and download software from the electronic storefront 172 described in the system 100.

Figure 6:
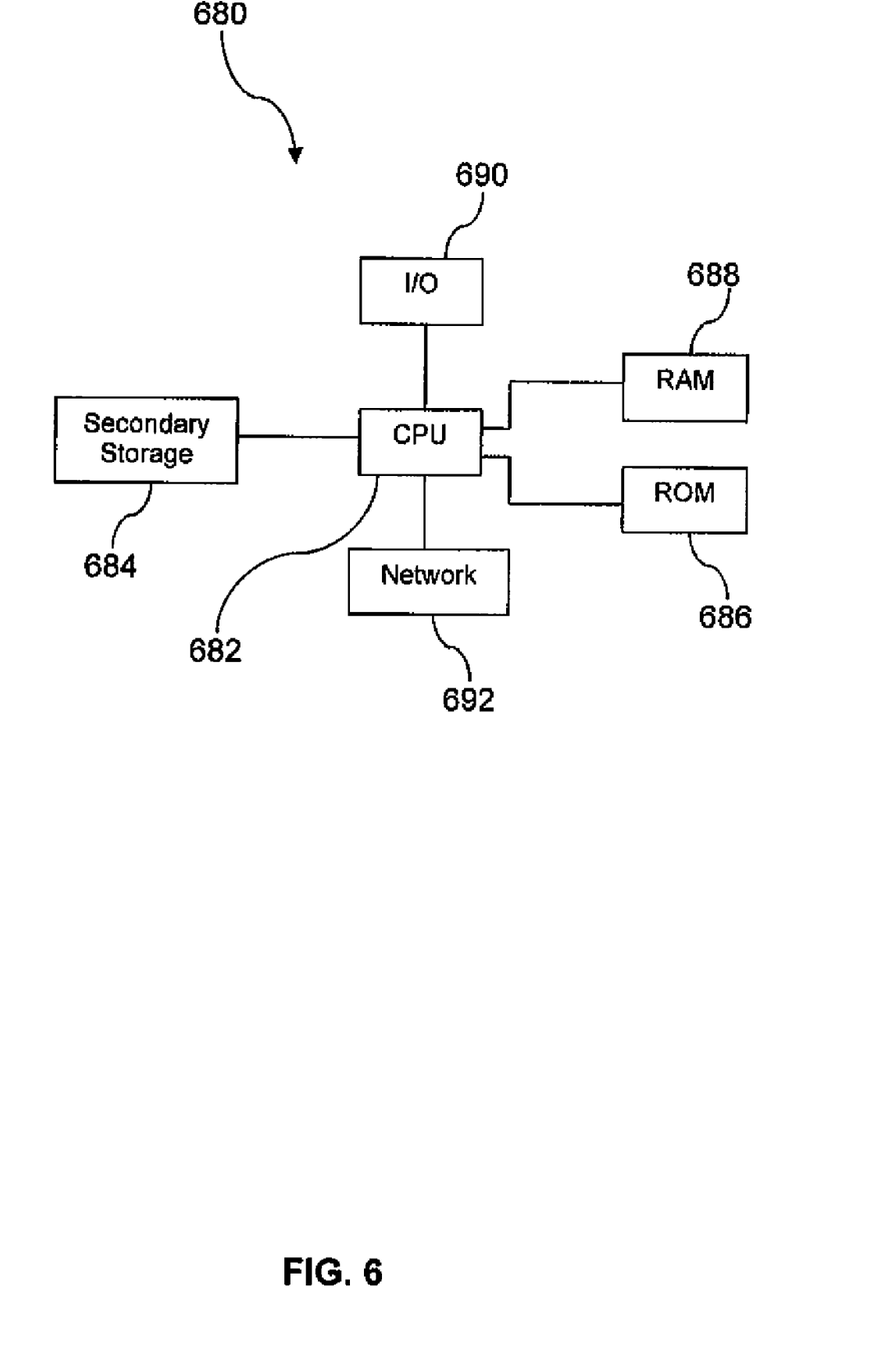
FIG. 6 illustrates an exemplary computer system suitable for implementing some aspects of the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards based on a technology such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for handset service migration, comprising:
   a computer having a processor and a memory; and
   an application stored in the memory that, when executed by the processor,
      establishes a communication link with a mobile device provisioned with a first service on a wireless communication service provider network, wherein at least a portion of the communication link is provided by a wireless link over infrastructure of the wireless communication service provider network,
      maps a first service indicator associated with a first network to a second service indicator associated with a second network,
      sends a message to a provisioning system to remove the first service indicator from a service configuration of the mobile device,
      sends a message to the provisioning system to add the second service indicator to the service configuration of the mobile device,
      sends a message to a voice mail server to migrate a first voice mail data structure associated with the mobile device based on the first service and the first service indicator to a second voice mail data structure associated with the mobile device based on a second service and the second service indicator,
      deprovisions the first service associated with the first service indicator from the mobile device, and
      provisions the second service associated with the second service indicator to the mobile device, wherein the application further sends a message to a media server to provision routing selected communication sessions from the mobile device to a storefront associated with the second service, and wherein the message to the media server further identifies a phone number associated with the mobile device to enable content purchase transactions by the mobile device.

2. The system of claim 1, wherein the wireless link is provided based on one of a code division multiple access (CDMA) technology, a global system for mobile telecommunication (GSM) technology, a long-term evolution (LTE) technology, or a worldwide interoperability for microwave access (WiMAX) technology.

3. The system of claim 1, wherein the wireless link is based on one of a Wi-Fi technology or a Bluetooth technology.

4. The system of claim 1, wherein the first service indicator identifies a group talk capability of a push-to-talk functionality.

5. The system of claim 1, wherein the mobile device is one of a mobile phone, a personal digital assistant (PDA), or a media player.

6. The system of claim 1, wherein the mobile device is a wireless card associated with one of a desktop computer, a laptop computer, or a tablet computer.

7. A processor-implemented method for handset service migration, comprising:
   determining, by a server, that a mobile device that formerly had a first subscriber identity module installed associated with a first service type has had a second subscriber identity module installed associated with a second service type;
   mapping, by the server, a first service indicator associated with the first service type to a second service indicator associated with the second service type;
   sending, by the server, a message to a provisioning system to remove the first service indicator from a service configuration of the mobile device;
   sending, by the server, a message to the provisioning system to add the second service indicator to the service configuration of the mobile device;
   sending, by the server, a message to a voice mail server to migrate a first voice mail data structure associated with the mobile device based on the first service type and the first service indicator to a second voice mail data structure associated with the mobile device based on the second service type and the second service indicator;
   deprovisioning, by the server, the first service type associated with the first service indicator from the mobile device;
   provisioning, by the server, the second service type associated with the second service indicator to the mobile device; and
   sending, by the server, a message to a media server to provision routing selected communication sessions from the mobile device to a storefront associated with the second service type, wherein the message to the media server further identifies a phone number associated with the mobile device to enable content purchase transactions by the mobile device.

8. The method of claim 7, wherein the first service indicator comprises a push-to-talk group talk service order code.

9. The method of claim 8, further comprising sending a message to the mobile device to remove a third service indicator of the mobile device, wherein the third service indicator is associated with the first service type.

10. The method of claim 7, wherein the first service type is one of a pre-paid service or a post-paid service, wherein the second service type is a post-paid service when the first service type is a pre-paid service, and wherein the second service type is a pre-paid service when the first service is a post-paid service.

11. The method of claim 7, wherein the mobile device communicates based on one of a code division multiple access (CDMA) technology, a global system for mobile telecommunication (GSM) technology, a long-term evolution (LTE) technology, or a worldwide interoperability for microwave access (WiMAX) technology.

12. The method of claim 7, wherein the mobile device communicates based on one of a Wi-Fi technology or a Bluetooth technology.

13. The system of claim 1, wherein the application further sends a message to the voice mail server to migrate a first stored contact information associated with the mobile device based on the first service to a second stored contact information associated with the mobile device based on the second service.

14. The system of claim 1, wherein the application further sends a message to the voice mail server to migrate a first saved short message service messages associated with the mobile device based on the first service to a second short message service messages associated with the mobile device based on the second service.

15. The system of claim 1, wherein the application further sends a message to the mobile device to turn off a key guard function of the mobile device, and wherein at least one of the deprovisioning of the first service associated with the first service indicator from the mobile device or provisioning of the second service associated with the second service indicator to the mobile device occurs in response to a key input from the mobile device received by the application after the key guard function has been turned off.

16. The method of claim 7, further comprising:
sending, by the server, a message to the mobile device to disable a key guard function of the mobile device in response to determining the replacement of the first subscriber identity module with the second subscriber identity module in the mobile device,
wherein at least one of the deprovisioning, by the server, the first service type associated with the first service indicator from the mobile device or provisioning, by the server, the second service type associated with the second service indicator to the mobile device occurs in response to an input received by the server from a key input after the key guard function has been disabled.

* * * * *